United States Patent Office 3,781,378
Patented Dec. 25, 1973

3,781,378
HIGH TEMPERATURE MEMBRANE MATERIALS
Simon W. Kantor, Schenectady, and Peter C. Juliano, Scotia, N.Y., assignors to General Electric Company
No Drawing. Filed Nov. 24, 1971, Ser. No. 201,973
Int. Cl. C08g 47/10
U.S. Cl. 260—824 R                5 Claims

ABSTRACT OF THE DISCLOSURE

Block copolymers of polydiorganosiloxane and polycarbonate are provided having improved heat distortion and useful as high temperature membrane material. The polydiorganosiloxane-polycarbonate block copolymer membranes can be steam sterilized at elevated temperatures without altering membrane structure. A method for making such block copolymers also is provided utilizing certain dihydric phenols derived from cyclic ketones such as fluorenyl bisphenols, to make the polycarbonate blocks.

HIGH TEMPERATURE MEMBRANE MATERIALS

The present invention relates to certain polydiorganosiloxane-polycarbonate block copolymers and a method for making such materials.

As shown by Vaughn Pat. 3,189,662, assigned to the same assignee as the present invention, organopolysiloxane-polycarbonate block copolymers can be made by phosgenating a mixture of a dihydric phenol and the reaction product of a halogen terminated polydiorganosiloxane and a dihydric phenol. Depending upon the block size of the polydiorganosiloxane and the relative amount by weight of dihydric phenol to polydiorganosiloxane employed, a wide variety of useful products can be obtained by Vaughn's method. Among the uses to which the aforementioned polydiorganosiloxane-polycarbonate block copolymers of Vaughn can be employed are high strength elastomers, films and parts which can be made by conventional extrusion methods. In addition, these materials can be employed as insulating coatings for wires and rods, binding material for laminates, in adhesive formulations, etc. As shown by Pat. 3,419,634, Vaughn also assigned to the same assignee as the present invention, improved hydrolytic stability can be achieved in block copolymers of polydiorganosiloxane and polycarbonate by employing polydiorganosiloxane having certain chain stopping siloxy units, such as hydroxybutyldimethylsiloxy units in place of chlorodimethylsiloxy units providing block copolymers having Si—C linkages joining polydiorganosiloxane block and polycarbonate blocks.

It has been found that when utilized in the form of a film, the block copolymers of the aforementioned Vaughn patents exhibit unusual selective permeability for providing for the separation of particular gases from gaseous mixtures and as a permeselective membrane for liquids and for ion transfer. In applications requiring steam sterilization of such membranes in an autoclave, it has been found that under super heated conditions, the aforementioned membranes can readily distort, rendering these materials unsuitable in many medical areas, such as in artificial lung applications, for example the Peirce Lung.

The present invention is based on the discovery that polydiorganosiloxane-polycarbonate block copolymers having superior heat distortion resistance, and all of the valuable utilities possessed by the block copolymers taught in the above Vaughn patents are obtained by substituting certain dihydric phenols derived from cyclic ketones in place of the dihydric phenols, such as 2,2-bis(4-hydroxyphenyl)propane, (Bisphenol-A) employed in the above described Vaughn methods.

The polydiorganosiloxane-polycarbonate block copolymers provided by the present invention, can be more particularly described as consisting essentially of about 1% to 75% by weight of polycarbonate blocks having an average of at least about 2 and up to about 100 chemically combined carbonate units of the formula, (1) 

and from 99% to 25% of polydiorganosiloxane blocks consisting essentially of diorganosiloxy units of the formula, (2) 

where Z is a divalent organo radical derived from a cyclic organic ketone, and R is a monovalent organo radical selected from the class consisting of hydrocarbon radicals, halogenated hydrocarbon radicals and cyanoalkyl radicals.

The block copolymers of the present invention can be made by phosgenating a mixture of polydiorganosiloxane of the formula, (3) 

and a dihydric phenol of the formula (4)           HOZOH where Z is as previously defined, n is an integer equal to 1 to 500 inclusive, Y is a member selected from

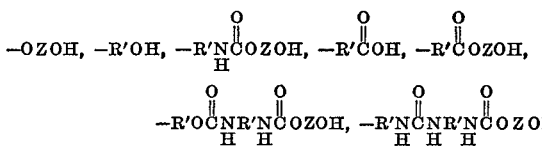

etc., and R' is selected from divalent hydrocarbon radicals and halogenated divalent hydrocarbon radicals.

Radicals included by Z are for example,

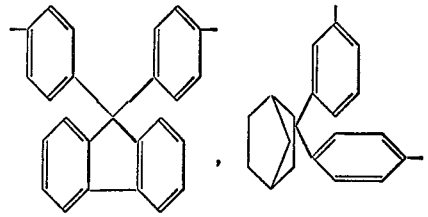

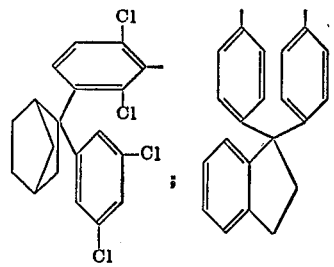

Radicals included by R are for example, monovalent aryl radicals and halogenated monovalent aryl radicals such as phenyl, chlorophenyl, tolyl, naphthyl, etc.; arylalkyl radicals such as benzyl, phenylethyl, etc.; saturated aliphatic radicals, cycloaliphatic radicals, and halo- aliphatic radicals, for example, alkyl radicals such as methyl, ethyl, propyl, chloropropyl, trifluoropropyl, butyl, pentyl, hexyl, octyl, etc.; cycloalkyl radicals such as cyclobutyl, cyclohexyl, cycloheptyl, etc., unsaturated aliphatic and cycloaliphatic radicals, for example, vinyl allyl, propenyl, etc.; cyclohexyl, cycloheptenyl, etc.; cyanoalkyl radicals such as cyanoethyl, cyanopropyl, cyanobutyl, etc. Radicals included by R' are divalent aryl radicals and halogenated divalent aryl radicals, such as for example, phenylene, tolylene, chlorophenylene, divalent alkylenearylene such as ethylenephenylene, propylenephenylene, etc., alkylene radicals such as methylene, ethylene, propylene, etc.

Included by the dihydric phenols of Formula 4, are for example,

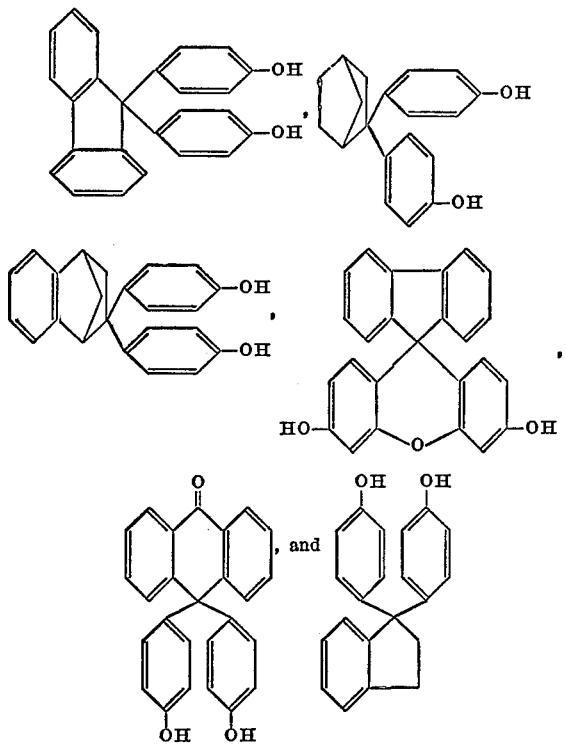

Methods for making these dihydric phenols are well known as shown for example, by: "Bisphenols Synthesis," W. J. Jackson and J. R. Caldwell, Ind. Eng. Chem., Prod. Res. Develop., 2, 246 (1963); "Macromolecules," P. W. Morgan, 3, 536 (1970); "Chemistry and Physics of Polycarbonates," H. Schnell, Polymer Reviews, vol. 9, Interscience New York (1964).

Included by the polydiorganosiloxane of Formula 3 are polydiorganosiloxanes having terminal dihydric phenol radicals resulting from the reaction of dihydric phenols included by Formula 4 and halogenated polydiorganosiloxanes described in Vaughn Pat. 3,189,662. The halogenated chain stopped polydiorganosiloxane can be made by conventional procedures, such as by the controlled hydrolysis of diorganodihalosilane, for example, dimethyldichlorosilane as taught in Patnode Pat. 2,381,-366, and Hyde Pats. 2,629,726 and 2,902,507. Another procedure which can be employed involves equilibrating a mixture of diorganodichlorosilane and a cyclic polydiorganosiloxane in the presence of a metal catalyst, such as ferric chloride as shown in Sauer Pat. 2,421,653 assigned to the same assignee as the present invention. Additional polydiorganosiloxane included by Formula 3 are polydiorganosiloxanes which have Si—C linkages in the terminal position. These organopolysiloxanes can be made by equilibrating cyclopolysiloxanes of the formula,

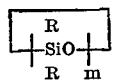

where R is as previously defined, and m is an integer equal to from 3 to 20, with 2,2-diorgano-1-oxa-2-silacycloalkanes, such as 2,2-dimethyl-1-oxa-2-silcyclohexane, 2,2- diphenyl-1-oxa-2-silacyclohexane, etc. These silacycloalkanes are taught by R. P. Anderson Pat. 3,083,219, assigned to the same assignee as the present invention. In addition as taught in Pat. 3,419,634 Vaughn other polydiorganosiloxanes included by Formula 3 can be made by effecting addition between olefinically unsaturated monohydroxy compounds, such as allyl alcohol, allyl phenol, etc. with a polydiorganosiloxanes having terminal hydride linkages. In addition to these polydiorganosiloxanes the block copolymers of the present invention can be made with polydiorganosiloxane having terminal ester linkages, and terminal urethane linkages as described in Pat. 3,419,634.

The block copolymers of the present invention are thermoplastic materials useful for making membranes. These copolymers can have a weight percent of from about 25 to 99% by weight of diorganopolysiloxane blocks based on the weight of block copolymer. Depending upon the weight percent of diorganopolysiloxane, the copolymers can be rubbery, or extrudable into fibers or cast from organic solvent solutions into films. For example, copolymers can be elastomeric which have a weight percent of from about 50% to about 95% organopolysiloxane, based on the total weight of organopolysiloxane-polycarbonate. A proportion of less than about 50% by weight of organopolysiloxane based on the total weight of copolymer, can be extruded into fibers, cast or sprayed from organic solvent into thermoplastic films, etc. Suitable organic solvents for the copolymers of the invention are for example, methylene chloride, chloroform, symmetrical tetrachloroethane, tetrahydrofuran, dioxane, etc. In some instances, the block copolymers of the present invention also can be milled with standard fillers, such as reinforcing and non-reinforcing fillers. For example, silicon fillers such as fumed silica, precipitated silica, etc., zinc oxide, carbon black, titania, etc. can be incorporated by milling or blending with the copolymer to achieve additional benefits such as improved tensile strength, abrasion resistance, etc.

The block copolymers can be autoclaved without exhibiting any heat distortion. When utilized as membrane material the block copolymers preferably consist of from about 99% to 25% by weight of organopolysiloxane and from 1% to 75% by weight of polycarbonate. The polydiorganosiloxane blocks in the aforementioned membrane materials preferably consist of 5 to 500 diorganosiloxy units and the polycarbonate blocks preferably consist of 2 to 500 carbonate units.

In the practice of the invention, the block copolymers can be made by phosgenating a mixture of the dihydric phenol and the polydiorganosiloxane shown by Formula 3.

During, phosgenation, experience has shown that substantially anhydrous conditions should be maintained to provide for optimum results. Acid acceptors which can be employed during phosgenation are pyridine and other tertiary amines, such as triethyl amine, etc. Agitation of the mixture as well as the employment of a suitable organic solvent has been found to facilitate the formation of copolymers. A suitable organic solvent includes for example, chlorobenzene, methylene chloride, etc., while any organic solvent which is inert to the reactants and sufficiently high in boiling point to achieve satisfactory results can be employed. A temperature between 0° and 200° can be utilized during phosgenation and preferably a temperature between 20° C. to 100° C. Phosgenation can be continued until no further increase in the viscosity of the mixture is experienced or until the introduction of phosgene into the mixture results in no further reaction. Separation of the copolymer can be effected by conventional precipitation, washing and filtering procedure.

In order that those skilled in the art will be better able to practice the invention, the following examples are given by way of illustration and not by way of limitation. All parts are by weight.

Example 1

There was added under substantially anhydrous conditions 14.31 parts of a chlorine terminated polydimethylsiloxane having an average of about 19 chemically combined dimethylsiloxy units to a mixture of 10 parts of 9,9-bis(4-hydroxyphenyl)-fluorene, 37.5 parts of dry methylene chloride and 10.9 parts of dry pyridine. The addition took approximately 30 minutes during which time the mixture was vigorously stirred. There was then added phosgene at a rate of 0.74 part per minute until a precipitate of pyridine hydrochloride appeared. The phosgene flow rate was then reduced to 0.06 part per minute, and the mixture was stirred until a maximum viscosity was achieved. A solution of 5 parts of methanol and 25 parts of methylene chloride was then added and a solution was stirred for 5 minutes. Another 38 parts of methylene chloride was added to reduce the viscosity of the mixture. There was then added 50 parts of a 2.4 N hydrochloric acid solution and the mixture was stirred to remove excess pyridine. Product was recovered from the mixture which was washed with water until it was free of chloride ion. Polymer was then precipitated by pouring the resulting product into a tenfold excess of methanol, filtering and drying in a vacuum oven overnight at 80° C. There was obtained an 85.3% yield of product. Based on method of preparation the product was a block copolymer having the average formula,

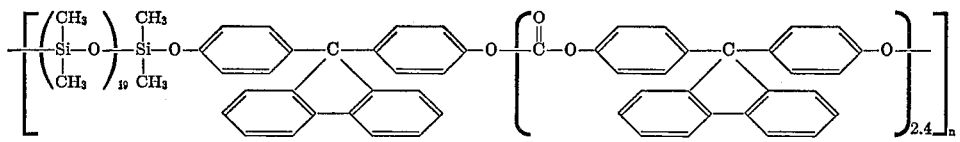

The identity of the above block copolymer was further confirmed by elemental analysis. It's intrinsic viscosity in chloroform was 0.93 at 25° C.

A polydimethylsiloxane-polycarbonate block copolymer was prepared in accordance with the teaching of Vaughn Pat. 3,189,662 having approximately the same percent by weight and average block size of the polydimethylsiloxane and about the same average block size of polycarbonate as the above described polydimethylsiloxane-polycarbonate block copolymer. Films were cast from the respective block copolymers. Test slabs were then prepared from each of the respective films to compare the physical properties of the respective block copolymers at 25° C. and 100° C.

In Table I below there is shown the results obtained from the respective block copolymers. Each of the block copolymers had about 55% by weight of polydimethylsiloxane with an average block size of about 19 dimethylsiloxy units. The block copolymer prepared in accordance with the present invention "Bis-Fluorene" is compared to the block copolymer prepared in accordance with the method of Vaughn "Bisphenol-A," where "T" is tensile strength (p.s.i.) at break, "E" is elongation percent at break, expressed at both 25° and 100° C.

TABLE I

|  | 25° C. | | 100° C. | |
| --- | --- | --- | --- | --- |
|  | T | E | T | E |
| Bis-fluorene | 3,620 | 390 | 1,120 | >610 |
| Bisphenol-A | 2,900 | 410 | 92 | >600 |

1.2 ml. films were cast from methylene chloride solutions of the above respective block copolymers to determine the permeability coefficient of these materials for a variety of gases. Table II shows the results obtained where the permeability coefficient was determined at 25° C., the values shown can be converted to permeability parameters expressed as CC(RTP)—CM/CM$^2$-sec.-cm. Hg, by multiplying these values by $10^9$.

TABLE II

|  | 25° C. | |
| --- | --- | --- |
| Gas | Bis.fluorene | Bisphenol-A |
| $N_2$ | 6.4 | 7 |
| $O_2$ | 15 | 16 |
| $CO_2$ | 87 | 97 |

A peel test was conducted on test slabs obtained from 15 mil sheets cast from each of the above block copolymers. The test slabs were 4" x ¼", which were used to determine whether the slabs would fuse together in areas of contact while being autoclaved at 250° F. for 30 minutes. Composites of each of the respective slabs were made which were separated on one end with a ¾" by .001" Teflon® tape for the peel test allowing for sufficient slab contact on the other end. Microscope cover glasses were also placed on top of the respective composites to prevent the strips from sliding in the autoclave. The composites were placed on Teflon® tape strips to prevent any interaction with the surface of the autoclave.

After autoclaving, the samples were tested at a crosshead speed of 0.02" per minute in an Instron tensile tester with a full scale deflection of 2 pounds. The test was designed to measure whether any force was required to peel the two strips apart, particularly where the slabs contacted each other. It was found that the block copolymer made from Bisphenol-A required a force of 6 pounds per inch of contact to separate the two strips in the composite, indicating fusion had taken place. The composite of the Bis-Fluorene block copolymer strips did not register any deflection on the scale.

Those skilled in the art would know that if a Peirce Lung, described in Trans. Am. Soc. of Artificial and Internal Organs, No. 14, 1968, p. 220, relating to high permeability copolymer membranes, were made with membrane derived from Bisphenol-A, block copolymer, it could not be autoclaved or sterilized satisfactorily. If autoclaving were attempted, the Bisphenol-A block copolymer membrane would be expected to fuse in area of contact between block copolymer, resulting in an increase in pressure drop across the lung due to a sealing of the lung membrane. A decrease in blood flow rate, also would result, necessitating an increase in pump pressure which would likely cause blood damage. However, as shown by the above results, a membrane made from Bis-Fluorene block copolymer in accordance with the present invention, would not exhibit any change in membrane characteristics and could be readily sterilized under the above described autoclaving conditions.

Example 2

A mixture of 14.80 parts of octamethylcyclotetrasiloxane and 260 parts of 2,2-oxa-silacyclohexane is heated at 180° C. for 2 hours in the presence of 1.8 part of potassium hydroxide. The resulting product is clear and homogeneous. When the product cools below 40° C. it is neutralized with acetic acid. The resulting oil is then dried with soda ash and filtered through diatomaceous earth. Based on method of preparation, there is obtained a polydimethylsiloxane having an average of about 20 chemically combined dimethylsiloxy units and terminal hydroxybutyldimethylsiloxy units.

A mixture of 23 parts of 2,2-bis(4 - hydroxyphenyl) norbornane, 25 parts of pyridine, 390 parts of methylene chloride, and 30 parts of the above hydroxybutyldimethylsiloxy terminated polydimethylsiloxane is phosgenated for about 45 minutes utilizing a rate of about 0.23 part of phosgene per minute. Rate of phosgenation is then reduced to 0.08 part of phosgene permitted over an additional 45 minutes. During the phosgenation, the mixture is vigorously stirred. At the termination of phosgenation, 450 parts of methanol are added to the mixture. A product precipitated. Based on method of preparation, the product is a polydimethylsiloxane-polycarbonate copolymer having terminal methyl carbonate radicals consisting of about 58.7 percent by weight of organopolysiloxane composed of polydimethylsiloxane blocks having terminal 4-(dimethylsiloxy)butoxy units chemically combined with 41.3 percent by weight of polycarbonate blocks based on the weight of copolymer. The copolymer is washed four times with methanol and then dried overnight at 85° C. There is obtained 39.8 parts of copolymer which represented a 72% yield based on starting reactants.

The block copolymer has the following average formula,

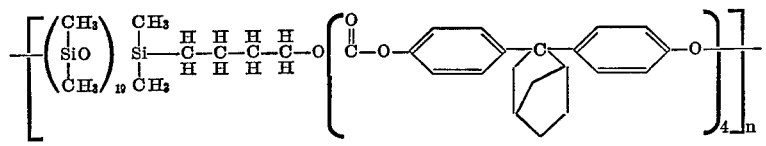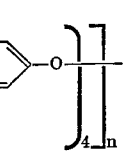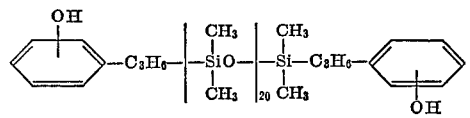

The identity of the above block copolymer is further confirmed by its elemental analysis. It has an intrinsic viscosity of 0.83 chloroform at 25° C.

Samples are prepared in accordance with the procedure of Example 1 to determine the physical properties of the block copolymer and 25° C., 60° C. and 100° C. as compared with the block copolymer prepared utilizing the same procedure except that Bisphenol-A is substituted for 2,2-bis(4-hydroxyphenyl)norbornane. Table III shows the results obtained where T and E are as previously defined and norbornane is the block copolymer of the present invention.

TABLE III

| | 25° C. | | 60° C. | | 100° C. | |
|---|---|---|---|---|---|---|
| | T | E | T | E | T | E |
| Norbornane | 2,880 | 420 | 2,500 | | 655 | >600 |
| Bisphenol-A | 2,600 | 370 | 1,700 | | 126 | |

Films are cast from the above block copolymers having thicknesses of about 3.2 mil. Following the procedure of Example 1, the permeability of the respective films with various gases was measured at 25° C. Table IV shows the results obtained.

TABLE IV

| | 25° C. | |
|---|---|---|
| GAS | Bisphenol-A | Norbornane |
| $O_2$ | 16 | 15 |
| $N_2$ | 7 | 6.5 |
| $CO_2$ | 97 | 85 |

Composites are prepared in accordance with the procedure of Example 1, to determine the ability of the respective copolymer films to resist change during autoclaving at 250° F. for 30 minutes. It is found that the block copolymers of norbornane exhibit substantially the same resistance to change as exhibited by the Bisfluorene block copolymers of Example 1. The block copolymers of Bisphenol-A failed as membrane materials under the autoclaving conditions, described above.

Example 3

There is added at a temperature of 90° C., 294 parts of a polydimethylsiloxane of the average formula,

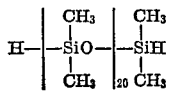

to a mixture of 60 parts of 2-allylphenol and 0.0014 part of platinum as a chloroplatinic acid-alcoholate complex. The mixture is stirred for a period of about 3 hours while maintaining a temperature between 90° C. to 115° C. An infrared spectrum of a potrion of the mixture shows it is free of silicon hydride. The mixture is allowed to cool to room temperature. A product is recovered by extraction with methylene chloride followed by washing the extract with a solution of 4 parts of methanol per part of water. The product is dried with anhydrous sodium sulfate and stripped of solvent to a temperature of 115° C. in vacuo. Based on method of preparation the product is a polydimethylsiloxane having the average formula,

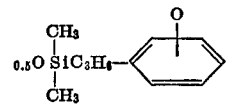

Following the procedure of Example 1, phosgene is passed into a mixture of 114 parts of 2,2-bis(4-hydroxy-3,5-dichlorophenyl) norbornane, 1340 parts of methylene chloride, 130 parts of pyridine, and 218 parts of the above polydimethylsiloxane.

After the phosgenation of the mixture, an additional 670 parts of methylene chloride is added. The mixture is hydrolyzed by stirring it with water. It is then washed with dilute hydrochloric acid to remove the excess pyridine. After washing free of chloride ions with distilled water, the product is precipitated by addition of methanol. Based on method of preparation, the product is a saturated organopolysiloxane-polycarbonate copolymer having terminal OH radicals. It is composed of about 63 percent by weight of organopolysiloxane composed of polydimethylsiloxane blocks having terminal $$_{0.50}\overset{CH_3}{\underset{CH_3}{SiC_3H_4}} - \phantom{x}$$

units chemically combined with about 37 percent by weight of polycarbonate blocks based on the weight of copolymer. This block polymer has an intrinsic viscosity of 0.38. The room temperature physical properties are: tensile strength—1800 p.s.i., elongation at break 540%.

The above block copolymer is then cast into a film to determine its ability to serve as a permeselective membrane at 25° and after being steam autoclaved. It is found that the block copolymer exhibits substantially the same ability to resist change during autoclaving at 250° F. for 30 minutes as shown by the Bis-Fluorene and norbornane block copolymers of the present invention in Example 1 and 2.

Although the above examples are limited to only a few of the very many block copolymers which can be employed in the practice of the invention to make the autoclavable membranes having thicknesses of from about .01 to 20 mils and preferably from 0.1 to 5 mils, it should be understood that the block copolymers of the present invention include blocks consisting essentially of Formula 1 and Formula 2 units.

What we claim as new and desire to secure by Letters Patent of the United States is:

1. Autoclavable permeselective membranes comprising block copolymers having an average of by weight of from about 1% to 75% of polycarbonate blocks consisting essentially of at least about two chemically combined units of the formula, $$-OZO\overset{O}{\underset{\|}{C}}-$$

and from about 99% to 25% of polydimethylsiloxane blocks having an average of about 19 or 20 dimethylsiloxy units, where Z is a divalent organo radical selected from the class consisting of

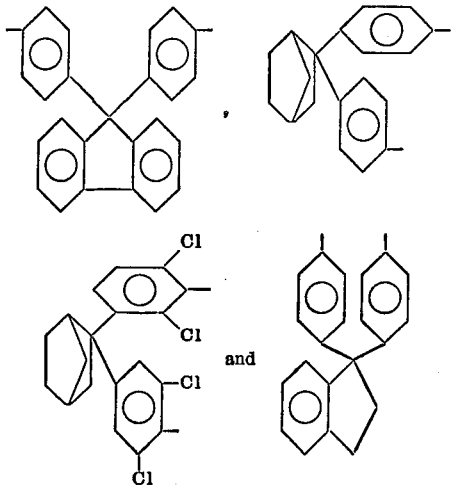

[and R is a monovalent organic radical selected from the class consisting of hydrocarbon radicals, halogenated hydrocarbon radicals, and cyanoalkyl radicals].

2. Autoclavable permeselective membranes in accordance with claim 1, where the polycarbonate blocks consisting esesntially of 9,9-bis(4-phenylene)-fluorene units.

3. Autoclavable permeselective membranes in accordance with claim 1, where the polycarbonate blocks consisting essentially of 2,2-bis(4-phenylene)-norbornane units.

4. Autoclavable permeselective membranes in accordance with claim 1, where the polycarbonate blocks consisting essentially of 2,2-bis(3,5-dichloro-4-phenylene)-norbornane units.

5. In a method for making block copolymers which comprises phosgenating at a temperature in the range of between about 0° C. to 200° C., a mixture comprising a dihydric phenol and polydiorganosiloxane having terminal dihydric phenol radicals, the improvement which comprises using as the polydiorganosiloxane a polydimethylsiloxane of the formula, $$Y-\left(\underset{\underset{CH_2}{|}}{\overset{\overset{CH_3}{|}}{SiO}}\right)_n\underset{\underset{CH_3}{|}}{\overset{\overset{CH_3}{|}}{Si}}-Y$$

and as the dihydric phenol a material selected from the class consisting of 9,9-bis(4-hydroxyphenyl)fluorene, 2,2-bis(4-hydroxyphenyl)norbornane, and 2,2-bis(4-hydroxy-3,5-dichlorophenyl)norbornane, where Y is a member selected from the class consisting of $$-\underset{\underset{H}{|}}{\overset{\overset{H}{|}}{C}}-\underset{\underset{H}{|}}{\overset{\overset{H}{|}}{C}}-\underset{\underset{H}{|}}{\overset{\overset{H}{|}}{C}}-\underset{\underset{H}{|}}{\overset{\overset{H}{|}}{C}}OH$$

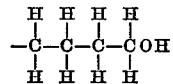

and

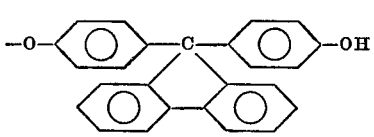

where $n$ is an integer equal to 19 or 20.

References Cited
UNITED STATES PATENTS

| | | | |
|---|---|---|---|
| 3,317,466 | 5/1967 | Caldwell et al. | 260—47 X |
| 3,326,854 | 6/1967 | Jackson et al. | 260—47 X |
| 3,461,097 | 8/1969 | Cotter et al. | 260—47 X |
| 3,419,634 | 12/1968 | Vaughn | 260—824 |
| 3,419,635 | 12/1968 | Vaughn | 260—824 |
| 3,189,662 | 6/1965 | Vaughn | 260—824 |

WILBERT J. BRIGGS, Sr., Primary Examiner

U.S. Cl. X.R.

3—1; 55—522; 210—500; 260—37 SB, 37 PC